United States Patent [19]

Grahl

[11] 4,373,287

[45] * Feb. 15, 1983

[54] FISHING TIP-UP

[76] Inventor: Paul F. Grahl, Rte. 1, Eden, Wis. 53019

[*] Notice: The portion of the term of this patent subsequent to Aug. 25, 1998, has been disclaimed.

[21] Appl. No.: 193,585

[22] Filed: Oct. 3, 1980

[51] Int. Cl.³ .............................................. A01K 97/01
[52] U.S. Cl. .......................................... 43/17; 43/19.2
[58] Field of Search ..................... 43/16, 17, 19.2, 27.4

[56] References Cited

U.S. PATENT DOCUMENTS

| | | | |
|---|---|---|---|
| 2,624,972 | 1/1953 | Burg | 43/17 |
| 2,976,640 | 3/1961 | Sensenbrenner | 43/19.2 |
| 3,807,078 | 4/1974 | Bartys | 43/17 |
| 4,033,062 | 7/1977 | Denecky | 43/19.2 X |
| 4,285,154 | 8/1981 | Grahl | 43/17 |

FOREIGN PATENT DOCUMENTS 698599 11/1979 U.S.S.R. ............................. 43/19.2

Primary Examiner—James L. Jones, Jr.
Assistant Examiner—Robert P. Olszewski
Attorney, Agent, or Firm—Harvey B. Jacobson

[57] ABSTRACT

A fishing tip-up utilizes a rocker arm which is pivotally mounted to a body member for oscillation about a horizontal axis to effect an up and down jigging movement of a hook and bait on a line associated with the arm so as to attract fish. The oscillation of the arm is accomplished through the use of a wind vane attached to the arm which serves to cause a movement of the arm in response to air movement coming into contact with the vane. An adjustable spring is operably attached to the pivotal arm so as to assist the wind vane in creating the up and down movement, and a tip-up flag assembly is provided to signal a remotely-located fisherman that a fish has taken the bait. The fishing line is wound on a spool journaled on the arm with the spool including an adjustable friction brake structure and the line extends through an aperture in the vane. The body member of the fishing tip-up is pivotally attached to a base member to enable folding for storage with the base member having extended ends so that excess fishing line may be wrapped about the base member when the tip-up is folded into a stored condition.

1 Claim, 3 Drawing Figures

U.S. Patent  Feb. 15, 1983  4,373,287
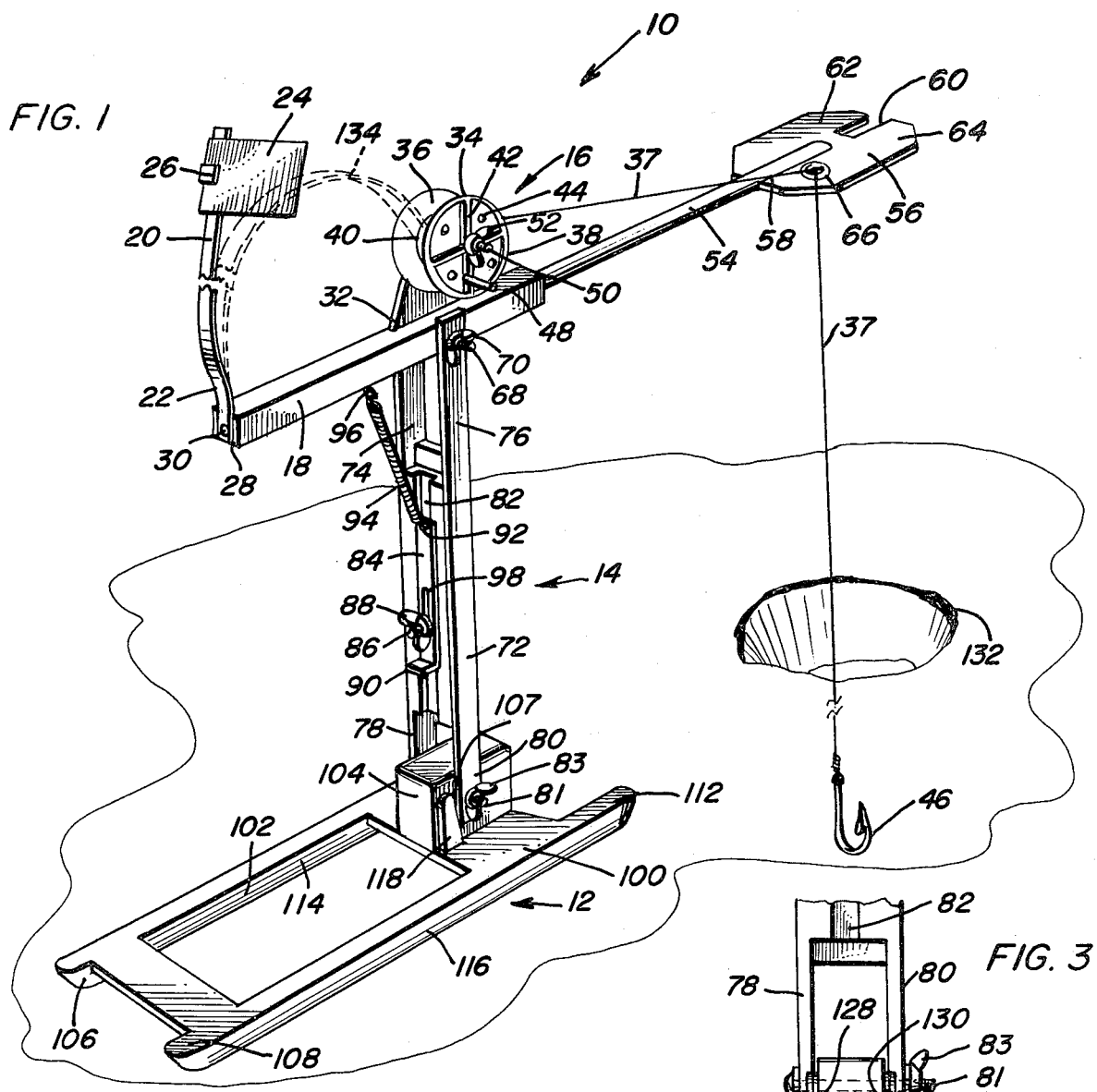
FIG. 1
FIG. 3
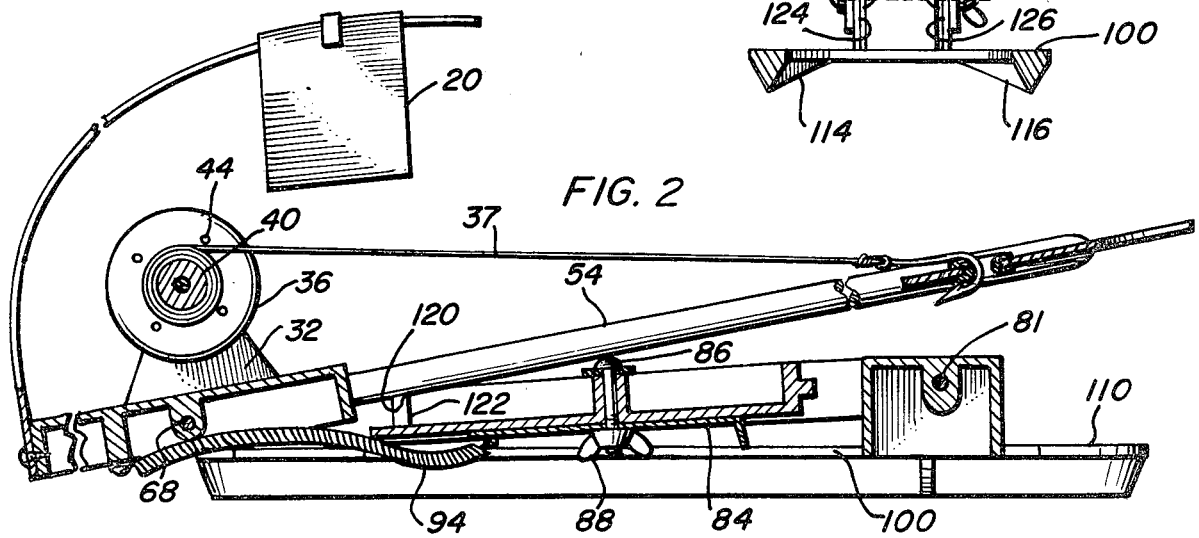
FIG. 2

FISHING TIP-UP

BACKGROUND OF THE INVENTION

1. Field of the Invention

The present invention relates to a fishing tip-up and, more particularly, pertains to a fishing tip-up which utilizes a signal flag for alerting a fisherman when a fish takes the bait and a wind vane for causing an oscillating movement of an arm of the tip-up so as to effect an up and down movement of a fishing bait to thereby attract fish.

2. Description of the Prior Art

The use of signal flag assemblies in combination with fishing tip-ups is generally well-known in the art. In this respect, U.S. Pat. No. 380,899, issued Apr. 10, 1888, to Jones, illustrates an early flag assembly for use in combination with a fishing tip-up. The flag assembly disclosed therein is spring biased towards a signalling or up position and is held in a non-signalling position by attaching an end thereof to the handle of a fishing reel. Once a fish strikes at a baited line, the handle of the reel moves to an extent that releases the flag assembly so that the biasing spring can cause the flag to move into the signalling position. Effectively then, the Jones reference discloses the typical state of the art flag assembly and provides for no additional structural features or functions other than the use of a signal flag.

This conventional flag assembly is to be found repeatedly in the prior art in such structural forms that differ very little from the Jones patent. For example, U.S. Pat. No. 1,451,124, issued Apr. 10, 1923, to Stolze, illustrates another signal flag assembly utilized in combination with a fishing tip-up, such flag assembly consisting of a flexible shaft being attached to a body member and having attached to a free end thereof a flag for indicating to a fisherman that a fish has taken a bait. The flexible shaft may be bent in a manner whereby the free end overlies a fishing reel assembly, and upon a striking of the bait by a fish, the reel assembly pivots about the body member so as to release the free end of the flexible shaft thereby permitting the flag assembly to move into a signalling or upward position. The flag signalling device as utilized by Stolze differs from the Jones disclosure only to the extent that the reel assembly is pivotable about the body member to thereby cause a releasing or signalling movement of the flag assembly. Similarly, U.S. Pat. No. 1,870,782, issued Aug. 9, 1932, to Minutilli, discloses a fishing tip-up which again uses a spring biased signal flag assembly whereby the flag is held in a non-signalling position through the engagement of the same with the handle of a fishing reel. Upon the turning of a fishing reel in response to a fish taking the bait, the flag assembly is released and is caused by the spring to move into a signalling position. As such, the above-discussed references point out the state of the art with respect to the use of spring biased signalling flag assemblies in combination with fishing reels and further illustrate the limited functions performed by all of these disclosed fishing tip-ups.

At least one fishing tip-up has utilized a spring in combination with a fishing rod pivotally mounted to a body member. In this connection, U.S. Pat. No. 2,803,912, issued Aug. 27, 1957, to Kellar, discloses a fishing rod pivotally mounted to a body member and being held in a balanced position on the body member by a spring attached to one end of the fishing rod and having its other end attached to the body member. A fishing line is attached to the other end of the fishing rod, and upon a pulling of the line in response to a fish striking the bait, the rod is pivotally moved about the body member and the spring serves to exert a biasing force thereto and against the movement of the line so as to effectively set the fishhook. No use is made of signal flag and no provision is made for causing an oscillatory movement of the fishing rod so as to effect an up and down movement of fishing bait to attract fish.

SUMMARY OF THE INVENTION

The general purpose of the present invention is to provide a fishing tip-up which includes the use of a signalling means to alert a fisherman as to when a fish has struck the bait and the use of an oscillation means to cause an up and down movement or jigging of fishing bait so as to attract fish thereto. In this respect, the fishing tip-up includes a fishing rod or rocker arm pivotally mounted to a body member and having rotatably attached thereto a fishing spool with fishing line thereon. The fishing line extends outwardly to a tip of the rod and through a grommet provided in a wind vane, and thence downwardly into the water. A coil spring is attached at one end thereof to the fishing rod and at its other end to the body member so as to provide a biasing force on the fishing rod thus balancing the rod about its pivot point with the body member. The wind vane may be bent in any desired position and causes a movement of the fishing rod in response to air movement about the rod. This movement is effectively an oscillatory movement which causes the fishing line to move up and down thereby causing the bait to move within the water so as to attract fish. Additionally, a signal flag assembly is attached to one end of the fishing rod, such assembly comprising a spring shaft having a flag on a free end thereof and being positionable beneath the fishing spool whereby a fish pulling the line off the reel causes the flag assembly to be released so as to signal a fisherman that his bait has been struck by a fish. The body member of the fishing tip-up is pivotally attached to a base member, such base member including arms extending from the ends thereof so that excessive fishing line may be wrapped about the base member when the fishing tip-up is in a stored condition. In this respect, the body member is pivotally connected at one end to the fishing rod and at the other end to the base member so as to facilitate the collapsing of the same to facilitate storage.

Accordingly, it is an object of the present invention to provide a new and improved fishing tip-up.

Another object of the present invention is to provide oscillation means in combination with a fishing tip-up so as to effect an up and down movement of fishing bait in response to surface air movement.

A further object of the present invention is the provision of a signal flag assembly utilizable in combination with a fishing tip-up having oscillation means provided thereon.

Still another object of the present invention is the provision of a fishing tip-up which may be conveniently collapsed and stored.

Yet another object of the present invention is the provision of a wind vane mounted on the end of a fishing rod associated with a fishing tip-up, such wind vane serving to effect an up and down movement of fishing bait in response to surface air movement.

A still further object of the present invention is the provision of a collapsible fishing tip-up which is mounted on a base provided with extended arms for storing excess fishing line thereon.

An additional object of the present invention is the provision of a new and improved fishing tip-up which may be easily and economically manufactured.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the fishing tip-up forming the present invention.

FIG. 2 is a side elevation view of the present invention, partly in section, illustrating the same is a collapsed position ready for storage.

FIG. 3 is a partial end elevation view, partly in section, illustrating structural features of the connection between the base and body members of the present invention.

DESCRIPTION OF THE PREFERRED EMBODIMENT

Reference is now made to the drawings, and in particular, to FIG. 1 wherein there is illustrated, in perspective, a preferred embodiment of the fishing tip-up forming the present invention and generally designated by the numeral 10. In this respect, the tip-up 10 includes a base or support assembly 12, a body member assembly 14 pivotally attached thereto, and a fishing rod or rocker arm assembly 16 pivotally attached to the body member assembly 14.

The fishing rod or rocker arm assembly 16 includes the use of a rocker arm 18 having attached at one end thereof a signal flag 20 which essentially comprises a steel spring arm 22 to which is mounted a flag 24 by conventional attachment means, such as clip 26. The spring arm 22 of the flag 20 is positionable within a groove 28 located on an end of the rocker arm 18 and being attached thereto by conventional attachment means such as screw 30. The rocker arm 18 is further provided with an upstanding spool bracket 32 to which is mounted a fishing spool 34 having fishing line 37 wound thereon. The spool 34, as well as most of the rocker arm 18, is of a molded cold water plastic construction, although it is to be understood that any conventional material might be used in the construction of the fishing tip-up forming the present invention. The spool includes a pair of parallel aligned spaced-apart circular plates 36, 38 which are integrally connected by a hollow spindle shaft member 40 about which the fishing line 37 is wound. On outside portions of the respective plates 36, 38, there is molded therein a plurality of ribs 42 so as to strengthen the spool and increase the endurance thereof. Several apertures 44 are provided in the respective plates 36, 38 so that a fishhook 46 may be hooked therein to facilitate the storing of the fishing tip-up 10. A secondary tipping device 48 is attached to the plate 38 to provide means for a fisherman to rotate the fishing spool 34 so as to wind the fishing line 37 onto the shaft member 40. The fishing spool 34 is secured to the spool bracket 32 by means of a threaded bolt 50 threaded into a threaded aperture in bracket 32 and being locked thereto by the head of the bolt 50 engaging the surface of the bracket 32 with the bolt 50 serving as a shaft about which the fishing spool 34 can rotate. In this connection, the fishing spool 34 is slipped over the threaded bolt 50 and is non-threadably engaged therewith so as to be freely rotatable thereabout. The spool 34 is prevented from coming off the threaded bolt 50 by means of wing nut 52 attached to the bolt and which can also be used as a tension setter if desired.

The rocker arm 18 further includes an extension portion or rocker arm dowel 54 which has a plated steel vane or wind flap 56 provided on a free end thereof. The wind flap 56, which may be of an octagonal construction, is attached to the rocker arm dowel 54 through insertion thereof into a slot 58 centrally disposed within the rocker arm dowel. In this connection, the wind flap 56 is fixedly secured within the slot 58 so as to prevent any separation therefrom. The wind flap 56 may be further provided with a cutout or slot 60 on one edge thereof so as to define a pair of extending flaps 62, 64, and is further provided with a grommet 66 defining an aperture located proximate to the rocker arm dowel 54 and serving as a guide receiving the fishing line 37. In this connection, the grommet 66 is of sufficient size to allow the fishing hook 46, as well as any fishing weights associated therewith, to be easily guided therethrough, while the extending flaps 62, 64 are designed to be bent in any desired manner so as to effectively capture the effect of surface air movement, ie., wind movement.

The entire rocker arm 18, including all of the apparatus attached thereto, is pivotally connected to the body member assembly 14 by means of a bolt 68 and wing nut 70 positioned therethrough. In this connection, the body member assembly 14 includes a body member 72 having a pair of parallel aligned spaced apart long arms 74, 76 and a pair of parallel aligned spaced-apart short arms 78, 80. Aligned apertures are provided in the long arms 74, 76 through which the bolt 68 may be directed so as to pivotally attach the rocker arm 18 to the body member assembly 14, while aligned apertures are also provided in the short arms 78, 80 so that a second bolt 81 and wing nut 83 assembly may be provided for pivotally connecting the body member assembly 14 to the base member assembly 12.

The body member 72 is further provided with a longitudinal groove 82 in which is slidably disposed an adjustment bracket 84. The adjustment bracket 84 is releasably positioned within the groove 82 through the use of a bolt 86 and wing nut 88. The adjustment bracket 84 is provided at one end thereof with a finger engaging portion 90, which may be utilized by an operator to facilitate movement of the bracket within the groove 82 when the bolt 86 and wing nut 88 are in a loosened condition, and at the other end thereof with an aperture 92 to which is secured an end of an oscillation or coil spring 94. In this connection, one end of the coil spring 94 is positioned within the aperture 92 and the other end of the spring is attached to an eyelet 96 securely attached to a bottom portion of the rocker arm 18. As such, the coil spring 94 serves to bias one end of the rocker arm 18 so as to effect a pivotal movement thereof about the bolt 68. As can be appreciated, the amount of spring force exerted on the rocker arm 18 by the coil spring 94 is dependent upon the positioning of the adjustment bracket 84 within the groove 82. In that the adjustment bracket 84 is provided with a longitudinal slot 98, it can be seen that the adjustment bracket may be moved relative to the body member 72 when the bolt 86 and wing nut 88 are loosened, so as to increase or decrease the amount of spring force exerted on the rocker arm 18. Once the desired amount of spring force is obtained, the bolt 86 and wing nut 88 may be tightened to securely lock the adjustment bracket 84 in position within the groove 82.

By the same token, pivotal movement of the rocker arm 18 about the bolt 68 may be limited by tightening the bolt 68 and wing nut 70 a desired amount so as to lock the arm 18 in relation to the body member 72. The rocker arm 18 may be retained in a balanced position which may be adjusted in dependence upon the amount of weight exerted on the fish line 37 by the fishhook 46 as well as the fishing bait and weights associated therewith.

As above mentioned, the body member assembly 14 is also pivotally attached to the base or support assembly 12 by the bolt 81 and wing nut 83 assembly as illustrated. In this respect, the base assembly 12 includes a base member 100 having a rectangular cutout 102 provided therein so as to reduce the weight associated with the base assembly 12, and a base block 104 integrally attached to the base member. The base block 104 has an aperture provided therethrough which is alignable with the aligned apertures associated with the short arms 78, 80 of the body member 72, so that bolt 81 may be used to attach the short arms of the body member to the base block. Further, provided on the base member 100 are a pair of short extending ends 106, 108 and a pair of long extending ends 110, 112. In this connection, the short extending ends 106, 108 and the long extending ends 110, 112 are oppositely directed from each other and serve as retaining means for excess fishing line which may be conveniently wrapped about the base 100 when the fishing tip-up 10 is in a stored condition. The extending ends 110, 112 are longer than the extending ends 106, 108 since it is necessary to balance the support assembly 12. In other words, and as clearly illustrated in FIG. 1, the cutout 102 serves to define a pair of rails 114, 116 which extend for a substantial distance from the base block 104 thereby to define a firm supportive base in combination with the extending ends 106, 108 so as to prevent the tip-up 10 from falling over in the direction of longitudinal extension of the rails. On the other hand, the rails 114, 116 do not extend very far from the base block 104 in a direction toward the fishing line 37, so that an effective balancing of the tip-up 10 is accomplished only through extending the length of the extending ends 110, 112.

As can be appreciated, it would be normally desired to securely position the body member assembly 14 in a locked erected position with respect to the base block 104 so as to prevent a collapse of the tip-up 10 into a stored position, such as illustrated in FIG. 2. Accordingly, a locking device 118 may be provided proximate to the base block 104 so as to give added support to the positioning of the body member 72 in combination with that support provided by the secure tightening of the wing nut 83 on the bolt 81. In this connection, the locking device 118 might take any structure or form which would serve to prevent a pivotable movement of the body member 72 about the base block 104. In the embodiment shown in FIG. 1, the locking device 118 is illustrated as a triangular wedge which might be integrally formed with the base block 104 and abuttable against the edge 107 of the body member 72 so as to limit rotation of the member 72 in a direction toward the short extending ends 106, 108. In this form of construction, the locking device 118 might be provided on both sides of the base block 104, while it would be necessary to provide suitable flexibility to the short arms 78, 80 to allow their positioning exteriorly of the locking device 118 through a loosening of the wing nut 83 and during a collapsing of the body member 72 against the support assembly 12 in a manner depicted in FIG. 2. Alternatively, the locking device 118 might be pivotally attached to the base member 100 in a conventional manner whereby it might be moved away from the base block 104 to permit the body member assembly 14 to be moved into a collapsed abutting position with respect to the support assembly 12.

With reference now to FIG. 2 of the drawings, which is a side elevation view of the fishing tip-up 10 partly in section, it can be seen that the tip-up may be conveniently collapsed so as to facilitate the transportation and storage thereof. In this respect, the adjustment bracket 84 is shown in an uppermost position whereby the tension on the spring 94 has been released, while the bolt 81 and wing nut 83 have been loosened so as to permit a downward pivoting of the body member 72 into a proximate abutting relationship with the base member 100. Once this position has been obtained, the bolt 81 and wing nut 83 may be retightened so as to securely lock the body member 72 in the position illustrated. Additionally, the bolt 68 and wing nut 70 have been loosened so as to permit a positioning of the rocker arm 18 into an proximate abutting relationship with the body member 72, as illustrated, and then retightened so as to securely lock the same in place. To further facilitate the collapsing of the tip-up 10 into the position illustrated, a notch 120 which conforms to the shape of the rocker arm dowel 54 may be provided in rib 122 to thereby prevent interference between the rib and the rocker arm dowel.

FIG. 3 illustrates further novel and advantageous constructional details of the present invention. In this respect, it can be seen that the rails 114, 116, which are an integral part of the base member 100, are of a V-shaped construction so as to provide adequate support for the tip-up 10 while at the same time presenting a minimal amount of surface area for ground contact. This V-shaped construction is important when ice fishing, since the rails 114, 116 will tend to freeze and thus stick to ice, and accordingly, the less surface area that is presented, the fewer the problems that will exist which relate to the freezing of the tip-up 10 to the ice. Also with reference to FIG. 3, it can be seen that internal recesses 124, 126 may be provided in the base block 104 into which are insertable lock washers 128, 130 so as to facilitate a firm grip between the short arms 78, 80 and the base block. In this connection, the recesses 124, 126 are centrally aligned with the aperture provided for the bolt 81 so that the lock washers 128, 130 may be respectively positioned therein in a manner whereby the bolt may be positioned therethrough. As such, a tightening of the wing nut 83 causes the arms 78, 80 to be pulled inwardly toward the base block 104 so as to effect a locking engagement therebetween through the use of the lock washers 128, 130.

In use, the fishing tip-up 10 may be positioned in a manner illustrated in FIG. 1, wherein the fishing line 37 having a fishing hook 46 attached thereto may be directed outwardly away from the fishing spool 34 through the grommet 66 contained in the wind flap 56 and thence downwardly through a hole 132 as might be cut out of an ice covered lake or river. Due to the weight of the bait and other associated fishing weights attached to the fishing line 37, the rocker arm 18 will tend to pivot about the bolt 68 so as to move the wind flap downwardly toward the hole 132. This downward movement is prevented by a selected adjustment of the coil spring 94 through movement of the adjustment bracket 84 in groove 82. In this connection, the adjustment bracket 84 is moved upwardly or downwardly in the groove 82 until the desired amount of spring force is achieved and then the adjustment bracket 84 is locked in position by the tightening of the wing nut 88 on the bolt 86. As such, the coil spring 94 offsets the weight of the bait and fishing weights located on and proximate to the fishing hook 46. At the same time, the rocker arm 18 is maintained in a pivotal relationship with the body member 72 through a proper adjustment of the bolt 68 and wing nut 70. Similarly, the amount of drag or force required to rotate the fishing spool 34 is adjustable through the proper tightening of the wing nut 52 on bolt 50. The signal flag 20 may then be bent into an inverted U-shaped condition as at 134 as illustrated in FIG. 1, so that the free end thereof is positioned against the surface of the shaft 40 and the fishing line wound on fishing spool 34 in remote relation to the vane whereby rotation of the spool in a manner to unwind the line 37 therefrom will cause the signal flag to rebound into its original position thereby signalling a fisherman that line has been rotatably removed from the fishing spool presumptively because a fish has struck the bait. The line 37 has to be wound on shaft 40 counterclockwise in FIG. 2 so that it leaves the shaft 40 tangentially from the top surface.

To facilitate a life-like up and down movement of the bait provided on the hook 46, the wind flap 56 may be bent into any desired manner so that force associated with the movement of wind across the surface of the river or lake may be imparted to the rocker arm 18 to thereby cause a pivotal movement of the same about the bolt 68. In this connection, it can be appreciated that the extending flaps 62, 64 might be bent upwardly and that wind striking the same will cause a backward movement of the rocker arm 18 about the bolt 68 to thereby lift the bait contained on the hook 46 upwardly toward the hole 132. Once the wind subsides to some degree, the weight of the bait on the hook 46 will cause the rocker arm 18 to pivot downwardly again toward the hole 132, and this process may be continually repeated in response to wind movement so as to provide the described up and down movement of the bait.

When it is desired to transport or store the fishing tip-up 10, the tension on the spring 94 may be first loosened by releasing wing nut 88 and moving the adjustment bracket 84 upwardly in the groove 82 toward the fishing spool 34. The wing nut 88 may then be tightened and the wing nuts 83 and 70 may be loosened to permit a collapse of the tip-up 10 into the position illustrated in FIG. 2. At this point, the wing nuts 70 and 83 are then tightened to securely lock the tip-up 10 in the position illustrated, and the fishing line 37 may be retrieved through a rotation of the fishing spool 34 by means of the secondary tripping device 48. If there is too much fishing line 37 for containment on the fishing spool 34, the excess line may be wrapped about the base member 100 between the extending short ends 106, 108 and the extending long ends 110, 112. The hook 46 may then be positioned within the grommet 66 or, alternatively, the hook may be positioned in any one of the plurality of apertures 44 provided in the fishing spool 34 to prevent free rotation and resultant unwinding of the line from the spool which could result in the line becoming tangled during storage. Also, the flag 24 and spring arm 22 are inserted under the spool 34 as indicated by position 135 in FIG. 1. As such, the tip-up 10 is then in a stored or easily transportable condition.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fishing tip-up for supporting a fish hook at a predetermined depth in the water, jigging the hook vertically and signaling that a fish has moved the hook without manipulation by a fisherman, said tip-up comprising an elongated base member adapted to be positioned on a supporting surface with one end adjacent an edge of the body of water in which a fish hook is to be placed, an elongated body member extending upwardly from said base member, means pivotally connecting the lower end of the body member to the base member adjacent the end thereof disposed adjacent the edge of the body of water with the length of the body member above the base member being generally equal to the distance between the pivotal connecting means and the other end of the base member to enable the body member to overlie and co-extend with the base member when pivoted to a collapsed position, said pivotal connecting means including means to releasably lock the body member in adjustable angular relation to the base member, an elongated rocker arm disposed generally horizontally at the upper end of the body member, means pivotally connecting the rocker arm to the upper end of the body member for pivotal movement of the rocker arm about a generally horizontal axis with the pivotal connection being intermediate the ends of the rocker arm but offset from the center thereof to provide an elongated portion extending substantially beyond the end of the base member disposed adjacent the edge of the water, a wind vane rigidly mounted on the outer end of the elongated portion of the rocker arm and adapted to be disposed in overlying relation to a portion of the body of water, a spool frictionally and rotatably journaled on the rocker arm generally in alignment with and above the pivotal connection between the rocker arm and body member, a fishing line wound on said spool, a fish hook on the end of the fishing line, said wind vane including an aperture adjacent the inner edge thereof receiving the fishing line for movement therethrough when the spool is rotated and providing an anchor for the fish hook when the fishing line is wound onto the spool with the barb of the hook underlying the vane to reduce the possibility of the fish hook injuring a person handling the device and reduce entanglement with other fishing equipment, a flexible resilient member attached to the end of the rocker arm remote from the wind vane and extending upwardly therefrom, a signal flag on the upper end of the resilient member, said resilient member having a length permitting it to be bowed with the upper end engaged with the surface of the spool when in a "set" condition and being released therefrom by rotation of the spool when the fishing line is unwound therefrom by a fish taking the hook thereby enabling the resilient member to return to an upstanding position with the flag being readily observable to indicate that a portion of the fishing line has been pulled from the spool, a tension coil spring extending diagonally from the rocker arm to the body member on the side of the pivotal connection between the rocker arm and body member remote from the wind vane, means adjustably connecting one end of the spring to said body member to balance the rocker arm and enable oscillation thereof about the pivotal connection between the rocker arm and body member, said wind vane being in the form of a plate having bendable flaps thereon to vary the force exerted thereon by wind impinging thereon with movement of the wind vane being responsive to wind variations to jig the hook up and down as the rocker arm oscillates, said means connecting one end of the spring to the body member including an elongated slotted member received in a longitudinal recess in the body member, a fastener extending through the slotted member and body member to retain the slotted member guided by the recess and longitudinally adjusted, said slotted member including a laterally extending tab handle at the lower end to facilitate longitudinal movement of the slotted member when the fastener is loosened, said base member including longitudinal rails having extending ends to facilitate winding of fishing line thereon for storage, said rails being of substantially V-shaped configuration to enable the base member to be easily lifted from an ice surface even though the lower edges of the rails may be frozen into the ice.

* * * * *